(12) United States Patent
Nagatomo

(10) Patent No.: US 8,903,600 B2
(45) Date of Patent: Dec. 2, 2014

(54) VEHICLE-MOUNTED DEVICE, CONTROL METHOD AND PROGRAM WITH PARKING SPOT DETECTION

(75) Inventor: Hideyuki Nagatomo, Kawasaki (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 981 days.

(21) Appl. No.: 12/918,073

(22) PCT Filed: Feb. 19, 2009

(86) PCT No.: PCT/JP2009/052849
§ 371 (c)(1), (2), (4) Date: Aug. 18, 2010

(87) PCT Pub. No.: WO2009/104662
PCT Pub. Date: Aug. 27, 2009

(65) Prior Publication Data
US 2010/0318261 A1    Dec. 16, 2010

(30) Foreign Application Priority Data

Feb. 21, 2008  (JP) ................ 2008-040731

(51) Int. Cl.
| | | |
|---|---|---|
| G06F 7/00 | (2006.01) | |
| G08G 1/0962 | (2006.01) | |
| G06Q 10/02 | (2012.01) | |
| H04W 4/06 | (2009.01) | |

(52) U.S. Cl.
CPC ............ *G08G 1/0962* (2013.01); *H04W 4/06* (2013.01); *G06Q 10/02* (2013.01)
USPC ........................................ 701/36

(58) Field of Classification Search
USPC ........................................ 701/36
See application file for complete search history.

(56) References Cited

FOREIGN PATENT DOCUMENTS

| JP | 2004-287807 | * 10/2004 | ............ G06F 17/30 |
|---|---|---|---|
| JP | 2005-182636 | * 7/2005 | ............ G06F 17/60 |
| JP | 2005-208943 | 8/2005 | |
| JP | 2005-228173 | 8/2005 | |

(Continued)

OTHER PUBLICATIONS

Notification of Transmittal of Translation of the International Preliminary Report on Patentability (Application No. PCT/JP2009/052849) dated Oct. 14, 2010.

(Continued)

*Primary Examiner* — Ramsey Refai
(74) *Attorney, Agent, or Firm* — Eric J. Robinson; Robinson Intellectual Property Law Office, P.C.

(57) ABSTRACT

An ITS vehicle-mounted device (17) sends/receives data in multi-content form. As a vehicle enters the communication area of a roadside apparatus (11), past drop-in place information is sent to the device (17) so that the driver can receive beneficial advertisement information. Places where the power of the ITS vehicle-mounted device (17) is turned off may be registered as past drop-in places contained in said past drop-in place information, and places of an idling stop may also be registered in the past drop-in place information. Highly accurate past drop-in place information can be produced by not registering when the stop time is short at a place where the power of the ITS vehicle-mounted device (17) is turned off or when a place is on the road right before an intersection as indicated by comparison with map data.

6 Claims, 7 Drawing Sheets

(56) References Cited

FOREIGN PATENT DOCUMENTS

| | | | | |
|---|---|---|---|---|
| JP | 2005-315657 | * 11/2005 | ............. | G01C 21/00 |
| JP | 2006-011814 | 1/2006 | | |
| JP | 2006-351041 | * 12/2006 | ............. | G06Q 30/00 |
| JP | 2007-155437 | 6/2007 | | |
| JP | 2007-293825 | * 11/2007 | ............... | G08G 1/09 |
| JP | 2008-020334 | 1/2008 | | |

OTHER PUBLICATIONS

Japanese Office Action (Application No. 2010-040676) dated Sep. 11, 2012.
International Search Report for Application Serial No. PCT/JP2009/052849 dated May 26, 2009.
Written Notification of Reason for Refusal (Application No. 2008-040731) dated Jul. 10, 2012.

* cited by examiner

SEVERAL TO 30 METERS

FIG. 3

| ID | CLASS | | CONTENTS OF INFORMATION |
|---|---|---|---|
| 00 | | COMPOSITION ID INFORMATION | AREA DESCRIBING ID COMPOSING DATA |
| 01 | PROVIDER | SERVICE PROVIDER CODE | PROVIDER CODE BY WHICH SERVICE PROVIDER CAN BE IDENTIFIED |
| | | SERVICE PROVIDER DISPLAY TEXT | SERVICE PROVIDER NAME (SERVICE NAME) TEXT INFORMATION TO BE DISPLAYED ON NAVIGATION UNIT |
| | | SERVICE PROVIDER PHONETIC CHARACTER STRING | SERVICE PROVIDER NAME (SERVICE NAME) PHONETIC CHARACTER STRING INFORMATION TO BE SPOKEN BY NAVIGATION UNIT |
| 02 | CONTENT | COMPANY CODE | CODE BY WHICH INFORMATION SOURCE OF CONTENT CAN BE IDENTIFIED |
| | | COMPANY DISPLAY TEXT | TEXT INFORMATION AS NAME OF COMPANY TO BE DISPLAYED ON NAVIGATION UNIT |
| | | COMPANY PHONETIC CHARACTER STRING | INFORMATION PROVIDING COMPANY NAME PHONETIC CHARACTER STRING INFORMATION TO BE SPOKEN BY NAVIGATION UNIT |
| | | INFORMATION CODE | INFORMATION CODE BY WHICH CONTENT CAN BE IDENTIFIED |
| | | INFORMATION DISPLAY TEXT | TEXT INFORMATION AS CONTENTS OF CONTENT TO BE DISPLAYED ON NAVIGATION UNIT |
| | | INFORMATION PHONETIC CHARACTER STRING | PHONETIC CHARACTER STRING INFORMATION OF CONTENTS OF CONTENT TO BE SPOKEN BY NAVIGATION UNIT |
| | | TASTE DATA CATEGORY | CATEGORY CODE INDICATING INFORMATION CATEGORY UNDER WHICH INFORMATION FALLS |
| 03 | | INSTANT REPRODUCTION/ STORAGE CODE | CODE REPRESENTING CONTENT REPRODUCTION OPERATION AFTER RECEPTION |
| | | REPRODUCTION CONDITION CODE | CODE INDICATING CONTENT REPRODUCTION CONDITION IN INFORMATION PROVISION AREA |
| 04 | EXPIRATION DATE AND TIME | START DATE AND TIME | EXPIRATION DATE AND TIME OF CONTENT |
| | | END DATE AND TIME | EXPIRATION DATE AND TIME OF CONTENT |
| 05 | PROVISION TIME | BUSINESS TIME | BUSINESS TIME OF CONTENT SOURCE |
| | | INFORMATION PROVISION TIME | CONTENT PROVISION TIME |
| 06-0F | | | |
| 10 | OBJECT POINT | OBJECT POINT COORDINATES | LATITUDE AND LONGITUDE INFORMATION OF POINT WHERE SERVICE CAN BE PROVIDED |
| | | OBJECT POINT TEXT TO BE DISPLAYED | SERVICE NAME (E.G., SHOP NAME) |
| | | AFFILIATED PARKING SPACE INFORMATION | INFORMATION ON AFFILIATED PARKING SPACE OTHER THAN OBJECT POINT |
| | | ICON DISPLAY IMAGE DATA | ICON DATA REPRESENTING PLACE WHERE SERVICE CAN BE PROVIDED |
| | | CHARACTER DATA TO BE DISPLAYED | TEXT INFORMATION FOR EXPLAINING SERVICE |
| | | DISPLAY IMAGE DATA | STILL IMAGE INFORMATION REPRESENTING SERVICE |
| | | PHONETIC CHARACTER STRING DATA | PHONETIC CHARACTER STRING INFORMATION REPRESENTING SERVICE |
| | | COMPRESSED SOUND DATA | COMPRESSED SOUND DATA INFORMATION |
| | | SOUND REPRODUCTION ORDER | ORDER IN WHICH PHONETIC CHARACTER STRING AND COMPRESSED SOUND ARE REPRODUCED |
| | | VIDEO DATA | VIDEO DATA INFORMATION |
| | | URL | URL INFORMATION REPRESENTING SERVICE |

| 21-2F | | | |
|---|---|---|---|
| 30 | TRANSITION INFORMATION | NEXT REPRODUCTION INFORMATION CODE 1 | SCREEN TRANSITION INFORMATION |
| | | ⋮ | ⋮ |
| | | NEXT REPRODUCTION INFORMATION CODE 8 | SCREEN TRANSITION INFORMATION |
| 31-3F | | | |
| 40 | DETAILED INFORMATION | DETAILED INFORMATION 1 | DETAILED INFORMATION |
| | | CHARACTER DATA TO BE DISPLAYED OF DETAILED INFORMATION 1 | DETAILED INFORMATION TEXT INFORMATION TO BE DISPLAYED ON NAVIGATION UNIT |
| | | PHONETIC CHARACTER STRING TO BE SPOKEN OF DETAILED INFORMATION 1 | DETAILED INFORMATION PHONETIC CHARACTER STRING INFORMATION TO BE SPOKEN BY NAVIGATION UNIT |
| | | ⋮ | ⋮ |
| | | DETAILED INFORMATION 8 | DETAILED INFORMATION |
| | | CHARACTER DATA TO BE DISPLAYED OF DETAILED INFORMATION 8 | DETAILED INFORMATION TEXT INFORMATION TO BE DISPLAYED ON NAVIGATION UNIT |
| | | PHONETIC CHARACTER STRING TO BE SPOKEN OF DETAILED INFORMATION 8 | DETAILED INFORMATION PHONETIC CHARACTER STRING INFORMATION TO BE SPOKEN BY NAVIGATION UNIT |
| 41-4F | | | |

| | | | |
|---|---|---|---|
| 80 | TASTE DATA | TASTE DATA VERSION NUMBER | VERSION INFORMATION OF TASTE DATA TABLE |
| | | TASTE DATA TABLE 1 | TEXT INFORMATION TO BE DISPLAYED OF TASTE DATA TABLE 1 |
| | | PHONETIC CHARACTER STRING OF TASTE DATA TABLE 1 | PHONETIC CHARACTER STRING INFORMATION TO BE SPOKEN OF TASTE DATA TABLE 1 |
| | | DETAILED INFORMATION OF TASTE DATA TABLE 1 | DETAILED INFORMATION OF TASTE DATA TABLE 1 |
| | | ⋮ | ⋮ |
| | | TASTE DATA TABLE 127 | TEXT INFORMATION TO BE DISPLAYED OF TASTE DATA TABLE 127 |
| | | PHONETIC CHARACTER STRING OF TASTE DATA TABLE 127 | PHONETIC CHARACTER STRING INFORMATION OF TASTE DATA TABLE 127 |
| | | DETAILED INFORMATION OF TASTE DATA TABLE 127 | DETAILED INFORMATION OF TASTE DATA TABLE 127 |

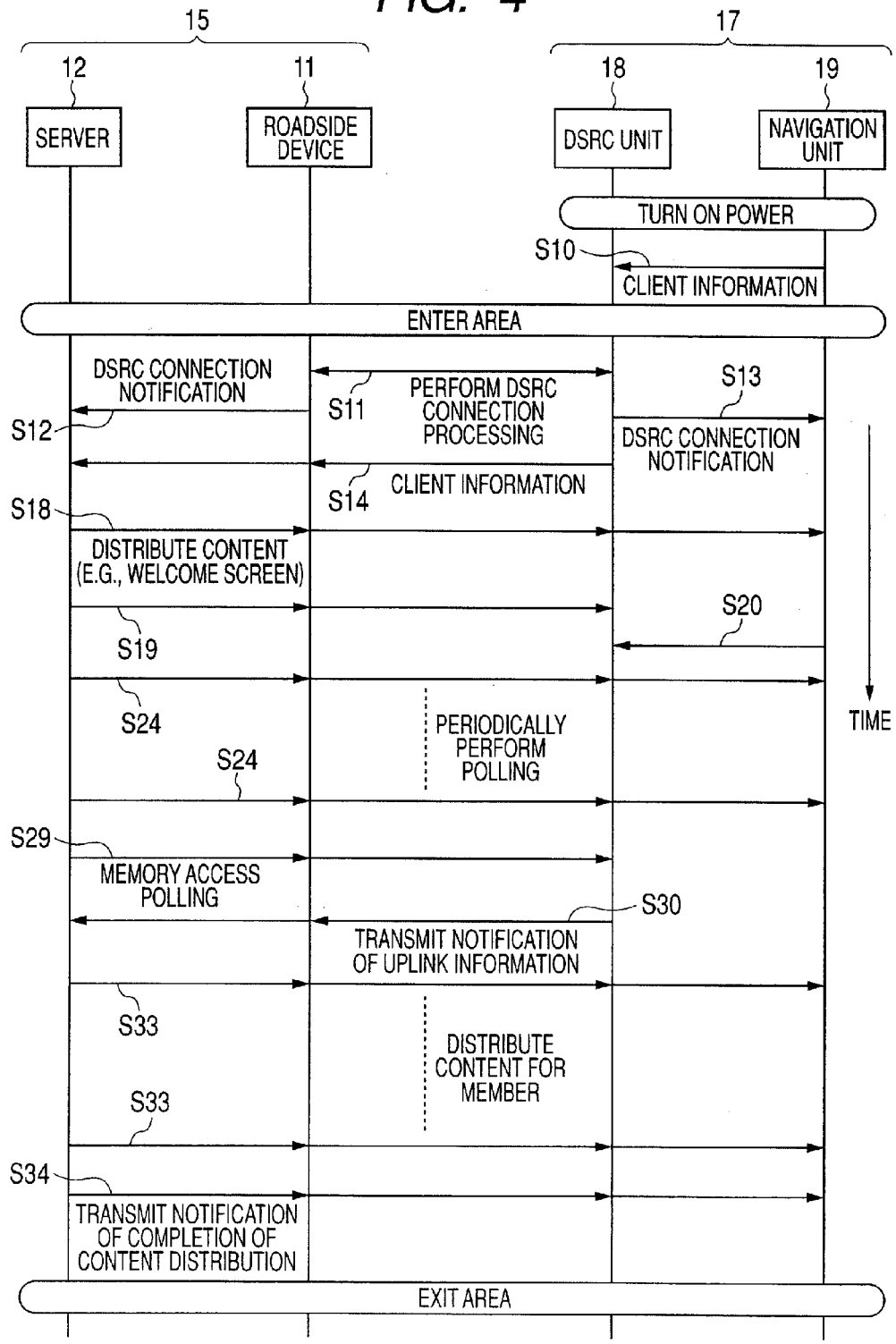

FIG. 5

| | | |
|---|---|---|
| TAG 1 | SERVICE PROVIDER CODE | |
| | DESTINATION | LATITUDE AND LONGITUDE |
| | WAY POINT 1 | LATITUDE AND LONGITUDE |
| | ⋮ | |
| | WAY POINT 5 | LATITUDE AND LONGITUDE |
| | TOTAL TRAVEL DISTANCE | |
| | TASTE GENRE TABLE VERSION NUMBER | |
| | TASTE GENRE DATA | |
| | MEMBER INFORMATION 1 | |
| | ⋮ | |
| | MEMBER INFORMATION 8 | |
| TAG 2 | SERVICE PROVIDER CODE | |
| | PAST DROP-IN PLACE 1 | LATITUDE AND LONGITUDE |
| | ⋮ | |
| | PAST DROP-IN PLACE 41 | LATITUDE AND LONGITUDE |
| TAG 3 | SERVICE PROVIDER CODE | |
| | PAST DROP-IN PLACE 42 | LATITUDE AND LONGITUDE |
| | ⋮ | |
| | PAST DROP-IN PLACE 82 | LATITUDE AND LONGITUDE |
| TAG 4 | SERVICE PROVIDER CODE | |
| | RECEPTION/REPRODUCTION HISTORY RECORD 1 | RECEIVED INFORMATION CODE |
| | | REPRODUCTION IDENTIFICATION FLAG |
| | ⋮ | |
| | RECEPTION/REPRODUCTION HISTORY RECORD 123 | RECEIVED INFORMATION CODE |
| | | REPRODUCTION IDENTIFICATION FLAG |
| TAG 5 | SERVICE PROVIDER CODE | |
| | RECEPTION/REPRODUCTION HISTORY RECORD 124 | RECEIVED INFORMATION CODE |
| | | REPRODUCTION IDENTIFICATION FLAG |
| | ⋮ | |
| | RECEPTION/REPRODUCTION HISTORY RECORD 246 | RECEIVED INFORMATION CODE |
| | | REPRODUCTION IDENTIFICATION FLAG |

US 8,903,600 B2

VEHICLE-MOUNTED DEVICE, CONTROL METHOD AND PROGRAM WITH PARKING SPOT DETECTION

TECHNICAL FIELD

The present invention relates to a vehicle-mounted device, a roadside apparatus, a control method, and a program for performing road-vehicle communication by using wireless communication such as DSRC (Dedicated Short Range Communication).

BACKGROUND ART

Patent Document 1 discloses a road-vehicle communication system using DSRC (FIG. 1 of Patent Document 1). In the road-vehicle communication system, a vehicle-mounted device of an automobile which has entered a communication area of a roadside apparatus receives advertising information through radio waves from the roadside apparatus and displays the advertising information on a display of a navigation unit (paragraph 0024 of Patent Document 1). The vehicle-mounted device is configured to automatically set a destination, connect to a home page, and perform dialing on the basis of positional information, a URL, and a telephone number included in the advertising information (S12, S14, and S16 in FIG. 4 of Patent Document 1).

Patent Document 2 discloses that a vehicle-mounted information terminal apparatus receives, from an information center, area information and time period information associated with advertising information together with the advertising information through radio waves (FIG. 1 of Patent Document 2) and displays the advertising information (FIG. 4 of Patent Document 2) when the current location is within an area related to the area information, and the current time is within a time period related to the time period information (S14 to S16 in FIG. 5 of Patent Document 2).

Patent Document 3 discloses an advertisement distribution system using DSRC (FIG. 1 of Patent Document 3). The advertisement distribution system is configured such that a vehicle-mounted device notifies a roadside apparatus of taste information (paragraph 0017 of Patent Document 3), the roadside apparatus transmits advertising information which is selected on the basis of the taste information to the vehicle-mounted device, and the vehicle-mounted device plays back the advertising information (paragraphs 0028 and 0029 of Patent Document 3).

Road-vehicle data transmission is basically performed through a push-type information distribution method using individual communication in DSRC communication in the 5.8 GHz band. Downlink information includes advertising information, and uplink information includes past drop-in place information of an automobile provided with a vehicle-mounted device. A roadside apparatus selects appropriate advertising information for each user on the basis of past drop-in place information and transmits the selected advertising information to a vehicle-mounted device of the user.

In the prior art, the current location when an engine is switched off, i.e., a vehicle-mounted device is powered off is registered as a drop-in place in past drop-in place information. If a drop-in place cannot be registered when the vehicle-mounted device is powered off, the drop-in place may be registered when the power to the vehicle-mounted device is turned on the next time.

Patent Document 1: Japanese Patent Application Laid-Open No. 2001-101578

Patent Document 2: Japanese Patent Application Laid-Open No. 2004-279509

Patent Document 3: Japanese Patent Application Laid-Open No. 2005-134707

DISCLOSURE OF THE INVENTION

Problems to be Solved by the Invention

Increasing interest in environmental problems leads to an increase in the frequency of idling stop operation, which switches off an engine at red lights or during a brief stop. In a conventional vehicle-mounted device, even a point where such idling stop operation is performed is registered as a past drop-in place in past drop-in place information because the vehicle-mounted device is powered off at the point. Since an idling stop operation point is not a point for substantial parking, which means that a user gets out of an automobile and performs shopping or the like, past drop-in place information including an idling stop operation point has harmful effects when useful advertising information is selected for each user based on the past drop-in place information. Also, a user parks an automobile at the user's home, at the home of an acquaintance of the user, at the user's workplace, and the like. Such pieces of information including the address of the user's home may be already known as member information or may not be useful as reference information for selection of content to be distributed. In addition, since the number of registrable pieces of past drop-in place information is limited, important parking spot information may be overwritten with unnecessary parking spot information to reduce the number of important pieces of past drop-in place information.

Patent Documents 1 to 3 refer to distribution of advertising information but provide no suggestions as to past drop-in place information.

The present invention has as its object to provide a vehicle-mounted device, a roadside apparatus, a control method, and a program capable of dealing with idling stop operation or the like and generating valuable past drop-in place information.

Means for Solving the Problems

According to the present invention, it is decided for each of points where a vehicle-mounted device has been powered off whether the point is appropriate as a drop-in place on which selection of advertising information and the like are based. Inappropriate points are not included in uplink information or are excepted from past drop-in place information in a roadside apparatus. More specifically, whether a point where the vehicle-mounted device has been powered off is appropriate is decided on the basis of (a) whether a parking duration at the point is equal to or less than a predetermined duration, (b) whether the point is found to be a point which cannot be considered as intended for parking from a commonsense standpoint (e.g., a point on a road in front of an intersection) as a result of checking of the point against map data, or (c) whether the point is one of a parking spot included in points which are excepted in advance by a user from registration as drop-in places, a parking spot within an area which is excepted in advance by the user from drop-in place registration, and a parking spot associated with a parking time within a time period which is excepted in advance by the user from drop-in place registration.

A vehicle-mounted device according to the present invention is one which wirelessly transmits uplink information including a past drop-in place to a roadside apparatus upon entry into a communication area of the roadside apparatus and includes the following:

parking spot detection means for detecting, as a parking spot, a point where the vehicle-mounted device has been powered off;

decision means for deciding whether the detected parking spot is appropriate as a past drop-in place of uplink information; and past drop-in place registration means for registering the detected parking spot as a past drop-in place of the uplink information if the parking spot is appropriate as a past drop-in place of uplink information.

A roadside apparatus according to the present invention is one which wirelessly receives uplink information including a past drop-in place from a vehicle-mounted device which has entered a communication area of the roadside apparatus and includes the following:

decision means for deciding whether the past drop-in place of uplink information is appropriate for inclusion in user information on which distribution of content to a user of the vehicle-mounted device is based; and exception means for excepting the past drop-in place from the user information if the past drop-in place of uplink information is inappropriate as a drop-in place.

A control method according to the present invention is a control method for a vehicle-mounted device which wirelessly transmits uplink information including a past drop-in place to a roadside apparatus upon entry into a communication area of the roadside apparatus and includes the following steps:

a parking spot detection step of detecting, as a parking spot, a point where the vehicle-mounted device has been powered off;

a decision step of deciding whether the detected parking spot is appropriate as a past drop-in place of uplink information; and a past drop-in place registration step of registering the detected parking spot as a past drop-in place of the uplink information if the parking spot is appropriate as a past drop-in place of uplink information.

A control method according to the present invention is a control method for a vehicle-mounted device which wirelessly transmits uplink information including a past drop-in place to a roadside apparatus upon entry into a communication area of the roadside apparatus and includes the following steps:

a parking spot detection step of detecting, as a parking spot, a point where the vehicle-mounted device has been powered off;

a decision step of deciding whether the detected parking spot is appropriate as a past drop-in place of uplink information; and a past drop-in place registration step of registering the detected parking spot as a past drop-in place of the uplink information if the parking spot is appropriate as a past drop-in place of uplink information.

A program according to the present invention is a program readable by a computer which is stored in a recording medium and executes a control method for a vehicle-mounted device which wirelessly transmits uplink information including a past drop-in place to a roadside apparatus upon entry into a communication area of the roadside apparatus. The program is executed on a processor of the computer and causes the computer to function as the means of the vehicle-mounted device according to the present invention described above by executing the following steps:

a parking spot detection step of detecting, as a parking spot, a point where the vehicle-mounted device has been powered off;

a decision step of deciding whether the detected parking spot is appropriate as a past drop-in place of uplink information; and a past drop-in place registration step of registering the detected parking spot as a past drop-in place of the uplink information if the parking spot is appropriate as a past drop-in place of uplink information.

Effect of the Invention

According to the present invention, it is possible to select a past drop-in place to be included in uplink information by a vehicle-mounted device and a past drop-in place included in uplink information received by a roadside apparatus.

BRIEF DESCRIPTION OF THE DRAWINGS

FIG. 3 is a table of classes assigned to IDs used in a downlink;

FIG. 4 is a chart showing communication and processes between devices to be performed in a transaction between a roadside apparatus and an ITS vehicle-mounted device;

FIG. 5 is a schematic chart for explaining the outline of pieces of data in uplink information to be transmitted from the ITS vehicle-mounted device to the roadside apparatus;

DESCRIPTION OF REFERENCES

Figure 1:
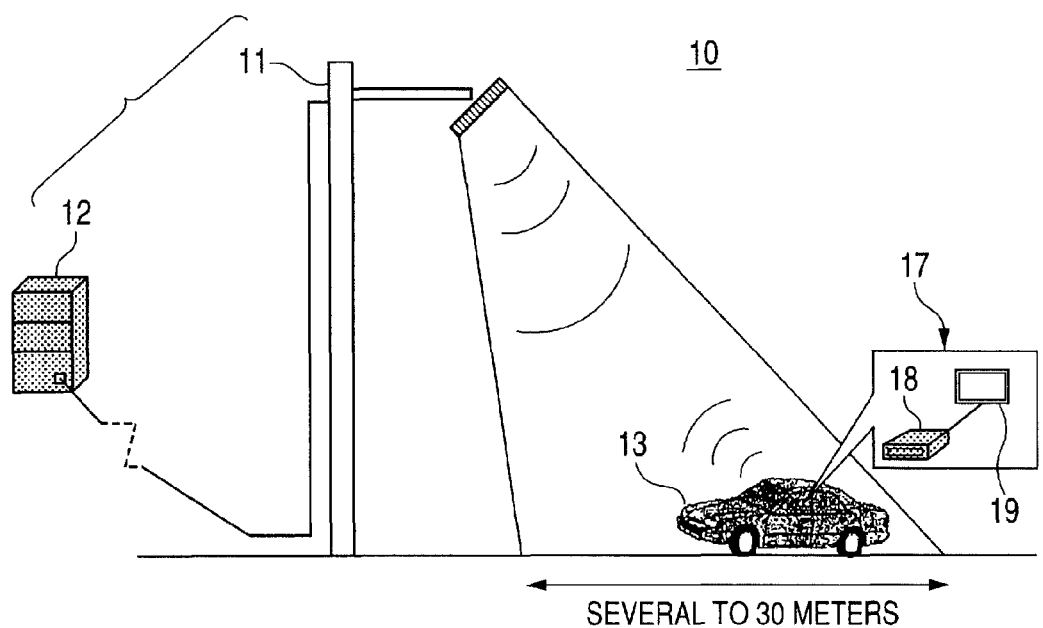
FIG. 1 is a schematic view of a road-vehicle DSRC system.

50: vehicle-mounted device
51: parking spot detection means
52: decision means
53: past drop-in place registration means
60: roadside apparatus
61: decision means
62: exception means
70: vehicle-mounted device control method
80: roadside apparatus control method

BEST MODES FOR CARRYING OUT THE INVENTION

FIG. 1 is a schematic view of a road-vehicle DSRC system 10 based on data in a Town Car Life Navi multi-content format. A roadside device 11 together with a server 12 constitutes a roadside apparatus 15 and is connected, through wires or wirelessly, to the server 12. The server 12 is capable of exchanging data with another server over a network such as the Internet. The roadside device 11 exchanges data with an ITS vehicle-mounted device 17 which is mounted on an automobile 13 present in an area several to 30 meters in length using radio waves in the 5.8 GHz band. The roadside device 11 and the server 12 constitute the roadside apparatus 15. The ITS vehicle-mounted device 17 includes a DSRC unit 18 and a navigation unit 19.

Figure 2:
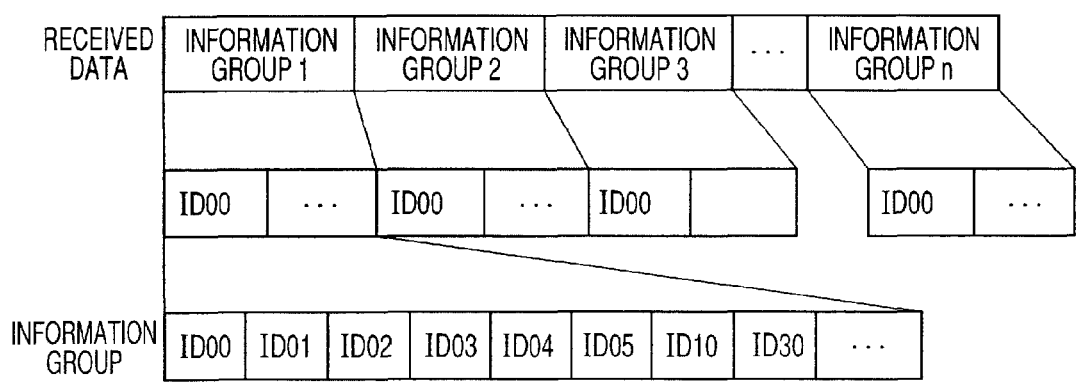
FIG. 2 is a chart for explaining a data transmission mode.

FIG. 2 is a chart for explaining a data transmission mode. In a downlink, pieces of data are classified into classes according to their types. ID codes of "00," "01," "02," ... are assigned to the pieces of data to correspond to the classes. In transmission of data in a multi-content format, pieces of data are bundled into information groups, and each information group has a piece of data in a class with an ID of "00" at the beginning. The piece of data in the class with the ID of "00" is composition information indicating which IDs are included in the information group.

FIG. 3 is a table of classes assigned to IDs used in a downlink. An ID of 00 is assigned to the class of composition ID information (an area describing ID composing data). An ID of 01 is assigned to the class of providers. Pieces of information with the ID of 01 include a service provider code (a provider code by which a service provider can be identified), service provider display text (service provider name (service name) text information to be displayed on the navigation unit), and a service provider phonetic character string (service provider name (service name) phonetic character string information to be spoken by the navigation unit).

An ID of 02 is assigned to the class of content. Pieces of information with the ID of 02 include a company code (a code by which the information source of content can be identified), company display text (information providing company name text information to be displayed on the navigation unit), a company phonetic character string (information providing company name phonetic character string information to be spoken by the navigation unit), an information code (an information code by which content can be identified), information display text (text information as the contents of the content to be displayed on the navigation unit), an information phonetic character string (phonetic character string information of the contents of the content to be spoken by the navigation unit), and a taste data category (a category code indicating an information category under which information falls).

An ID of 03 is assigned to the class of content, like the ID of 02. Pieces of information with the ID of 03 include an instant reproduction/storage code (a code representing a content reproduction operation after reception) and a reproduction condition code (a code indicating a content reproduction condition in an information provision area).

An ID of 04 is assigned to the class of the expiration date and time (term of validity). Pieces of information with the ID of 04 include a start date and time (the expiration date and time (term of validity) of content) and an end date and time (the expiration date and time (term of validity) of the content). An ID of 05 is assigned to the class of provision time. Pieces of information with the ID of include business time (the business time of a content source) and information provision time (content provision time).

An ID of 10 is assigned to the class of object points. Pieces of information with the ID of 10 include object point coordinates (the latitude and longitude information of a point where a service can be provided), object point text to be displayed (a service name (e.g., a shop name)), affiliated parking space information (information on an affiliated parking space other than the object point), icon display image data (icon data representing the place where the service can be provided), character data to be displayed (text information for explaining the service), display image data (still image information representing the service), phonetic character string data (phonetic character string information representing the service), compressed sound data (compressed sound data information), sound reproduction order (representing the order in which a phonetic character string and a compressed sound are played back), video data (video data information), and a URL (URL information representing the service).

An ID of 20 is assigned to the class of information providing points. Pieces of information with the ID of 20 include, for each of a total of 5 information providing points, information provision center coordinates (information on a latitude and a longitude at which pop-up information is to be played back), an information provision area (information on a radius from the center coordinates which defines an area where the pop-up information is to be played back), an information provision direction code (information on an information provision direction for which pop-up information is to be played back), an information provision road type (information on the type of a road on which the pop-up information is to be played back), display image data (still image data to be played back in a pop-up window), phonetic character string data (phonetic character string information to be played back in a pop-up window), compressed sound data (compressed sound data to be played back in a pop-up window), and sound reproduction order (a code representing the order in which pieces of sound data to be played back in a pop-up window are played back).

An ID of 30 is assigned to the class of transition information. Pieces of information with the ID of 30 include a total of 8 next reproduction information codes (pieces of screen transition information). An ID of 40 is assigned to the class of detailed information. Pieces of information with the ID of 40 include, for each of a total of 8 pieces of detailed information, character data to be displayed (detailed information text information to be displayed on the navigation unit) and a phonetic character string to be spoken (detailed information phonetic character string information to be spoken by the navigation unit).

An ID of 50 is assigned to the class of parking space information. Pieces of information with the ID of 50 include, for each of a total of 127 pieces of parking space information, a parking space ID (an ID by which a parking space can be identified), detailed information (the dynamic detailed information of the parking space), remarks (remarks about the parking space), and a remarks phonetic character string (a remarks phonetic character string to be spoken by the navigation unit). An ID of 60 is assigned to the class of driving support. Pieces of information with the ID of 60 include driving support image data (driving support image information), a driving support phonetic character string (data driving support phonetic character string information), a driving support compressed sound (data driving support compressed sound information), and sound reproduction order (representing the order in which a phonetic character string and a compressed sound are played back).

An ID of 80 is assigned to the class of taste data. Pieces of information with the ID of 80 include, for each of a total of 127 taste data tables, a taste data version number (the version information of the taste data table), a taste data table (text information to be displayed of the taste data table), a phonetic character string (phonetic character string information to be spoken of the taste data table), and detailed information (the detailed information of the taste data table).

FIG. 4 is a chart showing communication and processes between devices to be performed in a transaction between the roadside apparatus 15 and the ITS vehicle-mounted device 17. The roadside device 11 and the server 12 constitute the roadside apparatus 15. The ITS vehicle-mounted device 17 includes the DSRC unit 18 and the navigation unit 19. The communication and processes will be described in chronological order. Note that communication between the roadside device 11 and the DSRC unit 18 is performed through radio waves for DSRC and that communication between the roadside device 11 and the server 12 and communication between the DSRC unit 18 and the navigation unit 19 are generally performed through cables.

When the power to the ITS vehicle-mounted device 17 is turned on, client information data is written from the navigation unit 19 to the DSRC unit 18 in S10. When the automobile 13 provided with the ITS vehicle-mounted device 17 enters a radio wave coverage area at a distance (e.g., about 30 m) which allows communication with the roadside device 11, DSRC connection processing is performed between the roadside device 11 and the DSRC unit 18 in S11.

When the DSRC connection processing in S11 ends, DSRC connection notifications are transmitted in S12 and S13. The connection notification in S12 is transmitted from the roadside device 11 to the server 12 whereas the connection notification in S13 is transmitted from the DSRC unit 18 to the navigation unit 19. In S14, the server 12 is notified of the client information by the DSRC unit 18 via the roadside device 11.

The server 12 reads a vehicle-mounted device ID uniquely assigned to the DSRC unit 18 and determines whether a user of the ITS vehicle-mounted device 17 is a member or a nonmember. The server 12 also gains knowledge of the hardware information of the ITS vehicle-mounted device 17 for appropriately playing back content by the ITS vehicle-mounted device 17 on the basis of the client information, of which the server 12 is notified by the DSRC unit 18 after the communication establishment. In S18, the server 12 transmits content such as a welcome screen to the navigation unit 19 via the roadside device 11 and the DSRC unit 18. The content is organized in a multi-content format. The navigation unit 19 determines a service provider from the multi-content format.

After S18, the server 12 periodically polls the DSRC unit 18 in S19 until the navigation unit 19 writes uplink information to the DSRC unit 18. In S20, the navigation unit 19 writes uplink information to the DSRC unit 18 if the navigation unit 19 determines that the user of the ITS vehicle-mounted device 17 is a member of the service provider and does nothing if the user is not a member.

In S24, the server 12 transmits default content (e.g., public service information) to the navigation unit 19 via the roadside device 11 and the DSRC unit 18. In S29, the server 12 performs memory access polling of the DSRC unit 18. In response to this, in S30, the DSRC unit 18 notifies the server 12 of the uplink information if the user is a member.

In S33, the server 12 organizes storage-type content suited to member preferences in a multi-content format (FIG. 2) on the basis of member information acquired from the uplink information and distributes the storage-type content to the ITS vehicle-mounted device 17. In S34, the server 12 notifies the ITS vehicle-mounted device 17 of completion of the distribution of the storage-type content. The automobile 13 provided with the ITS vehicle-mounted device 17 exits the area for communication with the roadside device 11 upon the completion of the distribution.

FIG. 5 is a schematic chart for explaining the outline of pieces of data in uplink information to be transmitted from the ITS vehicle-mounted device 17 to the roadside apparatus 15. Uplink information is transmitted as a plurality of tags. Tag 1 includes a service provider code, a destination (a latitude and a longitude), way points (latitudes and longitudes) 1 to 5, a total travel distance, a taste genre data version number, taste genre data, and member information 1 to member information 8. Tag 2 includes a service provider code and past drop-in places (latitudes and longitudes) 1 to 41. Tag 3 includes a service provider code and past drop-in places (latitudes and longitudes) 42 to 82.

Tag 4 includes a service provider code and reception/reproduction history records (received information codes and reproduction identification flags) 1 to 123. Tag 5 includes a service provider code and reception/reproduction history records (received information codes and reproduction identification flags) 124 to 246.

As can be seen from FIG. 5, a plurality of pieces of past drop-in place information can be held for each of service providers with which a user has contracts. The last 82 past drop-in places in total are registered for each piece of past drop-in place information. If the number of past drop-in places exceeds 82, the earliest past drop-in place is overwritten with the latest past drop-in place. Pieces of past drop-in place information in the ITS vehicle-mounted device 17 are all reset when the pieces of past drop-in place information are transmitted to the roadside device 11. Each past drop-in place is given by a latitude and a longitude and is registered together with a parking time. When the ITS vehicle-mounted device 17 enters a communication area for a service provider, it transmits past drop-in place information corresponding to the service provider to the roadside device 11.

The ITS vehicle-mounted device 17 registers a point where it is currently located as a past drop-in place in past drop-in place information when power supply from an automobile battery to the ITS vehicle-mounted device 17 is cut off. During a period when an engine key is maintained in the accessory position after the engine key is turned from the ON position to the accessory position without being removed, power supply from the automobile battery to the ITS vehicle-mounted device 17 is maintained. A point where the automobile is stopped during the period is not registered as a past drop-in place in the past drop-in place information. When a driver turns the engine key from the accessory position to the start position to start the automobile and starts an engine, power supply from the automobile battery to the ITS vehicle-mounted device 17 is temporarily cut off. At this time, the point may be registered as a past drop-in place in the past drop-in place information.

The ITS vehicle-mounted device 17 screens parking spots to be registered in past drop-in place information in order to make the past drop-in place information appropriate. parking spots to be excepted from registration in past drop-in place information include one which is estimated to be registered at the time of idling-stop operation. A parking spot associated with a parking duration equal to or less than a predetermined duration, a parking spot which is checked against map data of the navigation unit 19 and is founded to be on a road near traffic lights at an intersection, and a parking spot which is checked against traffic jam information received from a beacon system or the like and is founded to be on a road that had been heavily congested are excepted from registration in past drop-in place information.

The ITS vehicle-mounted device 17 can be further configured such that a user can set a parking spot to be excepted from registration as appropriate. A user can set an individual point, an area, or a time period and except the individual point, a point within the area, or a point associated with a parking time within the time period from registration in past drop-in place information.

Figure 6:
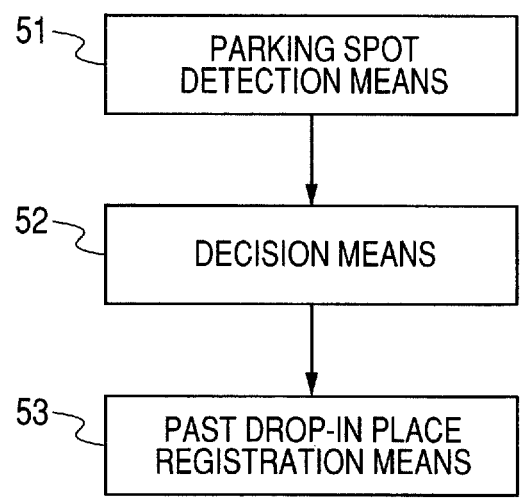
FIG. 6 is a block diagram of a vehicle-mounted device.

FIG. 6 is a block diagram of a vehicle-mounted device 50. The vehicle-mounted device 50 wirelessly transmits uplink information including a past drop-in place to a roadside apparatus upon entry into a communication area of the roadside apparatus. A specific example of the vehicle-mounted device 50 is the ITS vehicle-mounted device 17. The vehicle-mounted device 50 and a roadside apparatus 60 (FIG. 7) to be described later are not limited to those which transmit and receive data through DSRC. The vehicle-mounted device 50 and the roadside apparatus 60 may support another communication standard or another data format. The vehicle-mounted device 50 includes parking spot detection means 51, decision means 52, and past drop-in place registration means 53.

The parking spot detection means 51 detects, as a parking spot, a point where the vehicle-mounted device 50 is powered off. The decision means 52 decides whether the detected parking spot is appropriate as a past drop-in place of uplink information. The past drop-in place registration means 53 registers the detected parking spot as a past drop-in place of the uplink information if the detected parking spot is appropriate as a past drop-in place of the uplink information.

More specifically, there are conceivable case (a) where parking spots detected by the parking spot detection means 51 are all registered as past drop-in places in past drop-in place information, an inappropriate past drop-in place is removed from the past drop-in place information before an uplink, and the past drop-in place information is transmitted as uplink information to a roadside apparatus and case (b) where only appropriate parking spots are selected and registered in past drop-in place information, and the past drop-in place information is transmitted as uplink information to a roadside apparatus. The past drop-in place registration means 53 selects only appropriate past drop-in places from the past drop-in place information and registers the past drop-in places in the uplink information in case (a) and is involved in creation of the past drop-in place information in case (b). In case (a), if the number of registrable past drop-in places is limited, inappropriate past drop-in places are also registered in the past drop-in place information, only ones selected from registered past drop-in places including the inappropriate past drop-in places are registered in the uplink information, and the number of past drop-in places in the uplink information is small. In contrast, in case (b), the problem can be alleviated.

Typical inappropriate parking spots include (u1) a parking spot which is associated with a parking duration equal to or less than a predetermined duration, (u2) a parking spot which is registered as a user's home in a navigation apparatus, (u3) a parking spot which is a point prohibited by the user from being registered as a drop-in place, (u4) a parking spot within a predetermined area for which drop-in place registration is prohibited by the user, and (u5) a parking spot associated with a parking time within a time period for which drop-in place registration is prohibited by the user. The decision means 52 decides that any of the parking spots in cases (u1) to (u5) is inappropriate as a past drop-in place of uplink information.

Cases (u1) to (u5) will be looked at from the opposite standpoint. Assume (v1) a parking spot which is associated with a parking duration more than the predetermined duration, (v2) a parking spot which is not registered as the user's home in the navigation apparatus, (v3) a parking spot which is permitted by the user to be registered as a drop-in place, (v4) a parking spot within a predetermined area for which drop-in place registration is permitted by the user, and (v5) a parking spot associated with a parking time within a time period for which drop-in place registration is permitted by the user. The decision means 52 decides that any of the parking spots in cases (v1) to (v5) is appropriate as a past drop-in place of the uplink information.

In case (u1) described above, the predetermined duration is set to, e.g., 3 minutes. This setting allows exception of most of idling-stop operation points from uplink information. In a modification of case (u1), it can be decided that a parking spot associated with a parking duration equal to or more than another predetermined duration (e.g., 1 day) is an inappropriate past drop-in place. As for case (u2), information on the user's home is generally included in an address in member information submitted when the user contracts with a service provider and becomes a member of a content distribution service provided by the service provider, and the service provider need not gain knowledge of the information again. Additionally, the service provider wishes to know more past drop-in places other than the user's home, and exception of the user's home from registration is of significance.

The parking spots in cases (u3) to (u5) are parking spots which can be excepted from registration by user setting. By user setting, a user sets an individual parking spot to be excepted from registration, excepts all parking spots within a predetermined area from registration, or excepts a parking spot within a predetermined time period at midnight or on a specific day of the week. The user excepts a parking spot within the predetermined time period at midnight or on a specific day of the week by user setting. As described with reference to the past drop-in place information in FIG. 5, typical past drop-in place information to be transmitted to the roadside apparatus 60 includes a date and time when the user's automobile is stopped at a parking spot in addition to the latitude and longitude of the parking spot. The user can identify a day of the week on which a parking time associated with the parking spot falls and a time period within which the parking time falls, with no difficulty.

It is said that the spheres of life using cars of people are generally within a radius of 5 kilometers from their homes. The decision means 52 identifies the sphere of activity of a user on the basis of past drop-in places. For example, if a user has a sphere of activity within a radius of 2 kilometers from the user's home, the decision means 52 determines that the user has little need for advertising information within an area outside the radius of 2 kilometers. The user can set the area in case (u4), i.e., the area outside the radius of 2 kilometers from the user's home as an area inappropriate for registration, on the basis of the determination result.

The decision means 52 can decide whether each parking spot is appropriate as a past drop-in place of uplink information, on the basis of a result of checking against map data. For example, if a parking spot is checked against map data of the car navigation apparatus and is found to be a point which cannot be considered as intended for parking from a commonsense standpoint (e.g., a point on a road in front of an intersection), the decision means 52 can determine that the parking spot is an idling-stop operation point or an engine stall point. The decision means 52 checks a point corresponding to the latitude and longitude information (FIG. 5) of the drop-in point against latitude and longitude information of the map data and determines what kind of place the point is.

In decision about whether to register a parking spot as a past drop-in place of uplink information, it is also possible to perform the following operations: collect the statistics of past drop-in places and extract an area with dense or sparse drop-in places; and select a parking spot within or outside the specified area and register or not register the parking spot as a past drop-in place of uplink information.

In decision about whether to register a parking spot as a past drop-in place of uplink information, it is further possible to perform the following operations: collect the statistics of past drop-in places and extract an area with dense or sparse drop-in places; and select a parking spot within or outside the specified area and register or not register the parking spot as a past drop-in place of uplink information.

A roadside apparatus which has received uplink information with past drop-in places selected by the vehicle-mounted device 50 uses the uplink information to, e.g., select content to be distributed to the vehicle-mounted device 50. Examples of the content include content connected with advertising information. A roadside apparatus can acquire uplink information with valuable past drop-in place information and make processes such as content selection appropriate on the basis of the uplink information.

Figure 7:
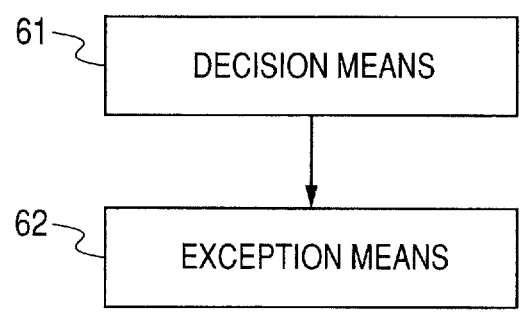
FIG. 7 is a block diagram of a roadside apparatus.

FIG. 7 is a block diagram of the roadside apparatus 60. The roadside apparatus 60 wirelessly receives uplink information including past drop-in places from the vehicle-mounted device 50, which has entered a communication area of a roadside apparatus. A specific example of the roadside apparatus 60 is the roadside apparatus 15 (FIG. 2). The roadside apparatus 60 includes decision means 61 and exception means 62. The roadside apparatus 60 supports a vehicle-mounted device which does not perform selective registration processing as in the vehicle-mounted device 50. If a vehicle-mounted device is configured to perform selective registration processing as in the vehicle-mounted device 50, a conventional roadside apparatus can be adopted instead of the roadside apparatus 60.

The decision means 61 decides whether each past drop-in place of uplink information is appropriate for inclusion in user information on which distribution of content to a user of the vehicle-mounted device 50 is based. The exception means 62 excepts the past drop-in place from the user information if the past drop-in place of the uplink information is inappropriate as a drop-in place.

Typically, the decision means 61 decides whether a parking spot is appropriate as a past drop-in place of uplink information, on the basis of a result of checking of the parking spot against map data of the roadside apparatus 60.

The roadside apparatus 60 uses pieces of past drop-in place information collected from the vehicle-mounted device 50 in the above-described manner to distribute content such as an advertisement to the user of the vehicle-mounted device 50. Of downlink information including content to be distributed, pieces of information with the IDs of 10 and 20 include the latitude and longitude information of an object point and an information providing point related to the content. The roadside apparatus 60 selects pieces of content which are intimately related to past drop-in places from the vehicle-mounted device 50 and transmits the pieces of content to the vehicle-mounted device 50.

Figure 8:
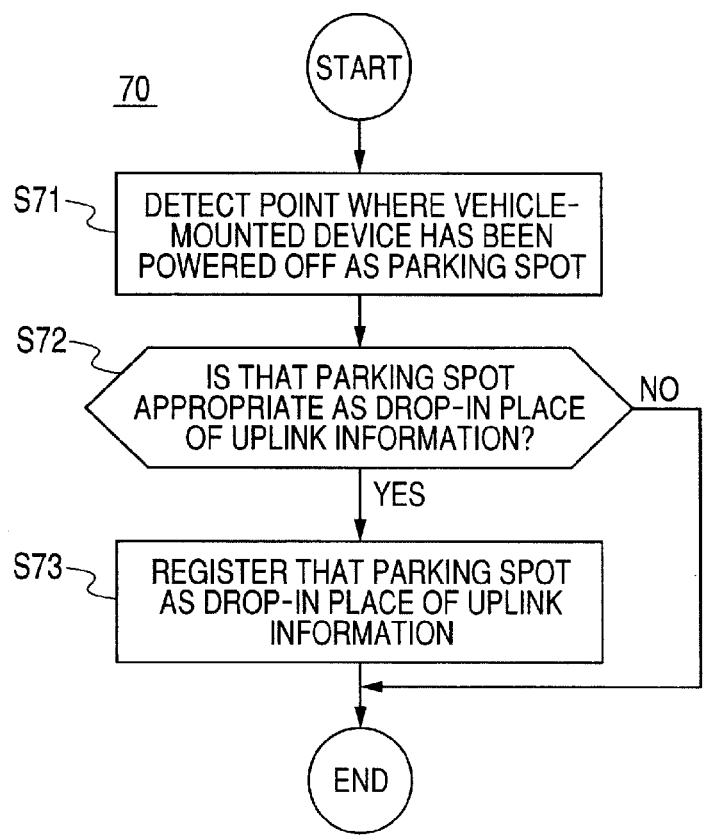
FIG. 8 is a flow chart of a vehicle-mounted device control method.

FIG. 8 is a flow chart of a vehicle-mounted device control method 70. The vehicle-mounted device control method 70 is applied to the vehicle-mounted device 50. In S71, a point where the vehicle-mounted device 50 has been powered off is detected as a parking spot. In S72, it is decided whether the detected parking spot is appropriate as a past drop-in place of uplink information. If a result of the decision is YES, the flow advances to S73. Otherwise, the vehicle-mounted device control method 70 ends. In S73, the parking spot is registered as a past drop-in place of uplink information.

The processes in S71 to S73 correspond to the functions of the parking spot detection means 51 to the past drop-in place registration means 53 of the vehicle-mounted device 50 (FIG. 6), respectively. Accordingly, specific modes described in terms of the functions of the parking spot detection means 51 to the past drop-in place registration means 53 can also be applied as specific modes to the processes in S71 to S73.

Figure 9:
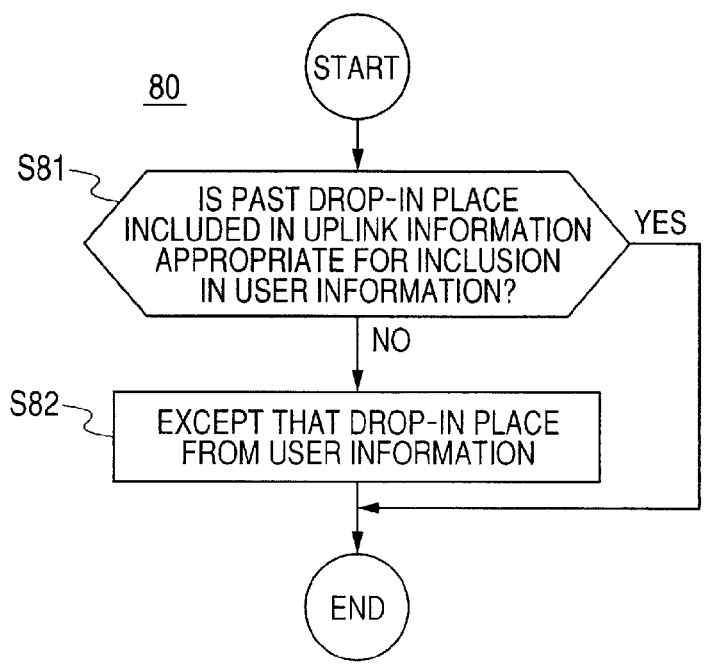
FIG. 9 is a flow chart of a roadside apparatus control method.

FIG. 9 is a flow chart of a roadside apparatus control method 80. The roadside apparatus control method 80 is applied to the roadside apparatus 60. In S81, it is decided whether each past drop-in place of uplink information is appropriate for inclusion in user information on which distribution of content to a user of the vehicle-mounted device 50 is based. If a result of the decision is YES, the roadside apparatus control method 80 ends. Otherwise, the flow advances to S82. In S82, the past drop-in place is excepted from the user information.

The processes in S81 and S82 correspond to the functions of the decision means 61 and the exception means 62 of the roadside apparatus 60 (FIG. 7), respectively. Accordingly, specific modes described in terms of the functions of the decision means 61 and the exception means 62 can also be applied as specific modes to the processes in S81 and S82.

A program to which the present invention is applied causes a computer to function as the means of the vehicle-mounted device 50. Another program to which the present invention is applied causes a computer to execute the steps of the vehicle-mounted device control method 70.

This specification discloses inventions with various scopes and at various levels. The inventions are not limited to apparatuses and methods with various technical scopes and at specific levels described in the specification and include one obtained by extracting one or a plurality of elements which have independent effects from the apparatuses and methods within a scope apparent to those skilled in the art, one obtained by changing one or a plurality of elements within a scope apparent to those skilled in the art, and one obtained by interchanging one element or a combination of elements of one of the apparatuses (or the methods) and one element or a combination of elements of another of the apparatuses (or the methods).

The invention claimed is:

1. A vehicle-mounted device adapted for use in a distribution system including a server apparatus for organizing content information in accordance with user's taste information, the vehicle-mounted device for providing the user's taste information to the server apparatus, and a roadside apparatus for transmitting the content information according to the user's taste information from the server apparatus to the vehicle-mounted device having entered into a wireless communication area, the roadside apparatus receiving uplink information including past drop-in place information together with the user's taste information from the vehicle-mounted device to forward the received uplink information to the server apparatus, wherein the server apparatus is capable of understanding the past drop-in place information and the content information while associating the past drop-in place information and the content information with each other, characterized in that the vehicle-mounted device comprises:

a parking spot detection unit configured to detect, as a detected parking spot, a point where the vehicle-mounted device has been powered off;

a decision unit configured to decide whether the detected parking spot is appropriate as a past drop-in place of the uplink information and deciding whether a duration for which the vehicle-mounted device has been powered off is more than a predetermined duration; and a past drop-in place registration unit configured to register the detected parking spot as a past drop-in place of the uplink information if the detected parking spot is appropriate as the past drop-in place of the uplink information and the duration for which the vehicle-mounted device has been powered off is more than the predetermined duration.

2. The vehicle-mounted device according to claim 1, wherein the decision unit decides that a parking spot where the vehicle-mounted device has been powered off for a duration equal to or less than the predetermined duration is inappropriate as the past drop-in place of the uplink information.

3. The vehicle-mounted device according to claim 1, wherein the decision unit decides on the basis of a result of checking against map data whether the parking spot is appropriate as the past drop-in place of the uplink information.

4. The vehicle-mounted device according to claim 1, wherein the decision unit decides that a parking spot which is registered as a home of a user in a navigation apparatus is inappropriate as the past drop-in place of the uplink information.

5. The vehicle-mounted device according to claim 1, wherein the decision unit decides that a parking spot which is a point prohibited by a user from being registered as a drop-in place, a parking spot within a predetermined area for which drop-in place registration is prohibited by the user, and a parking spot associated with a parking time within a time period for which drop-in place registration is prohibited by the user are inappropriate as the past drop-in place of the uplink information.

6. A method for controlling a vehicle-mounted device adapted for use in a distribution system including a server apparatus for organizing content information in accordance with user's taste information, the vehicle-mounted device for providing the user's taste information to the server apparatus, and a roadside apparatus for transmitting the content information according to the user's taste information from the server apparatus to the vehicle-mounted device having entered into a wireless communication area, the roadside apparatus receiving uplink information including past drop-in place information together with the user's taste information from the vehicle-mounted device to forward the received uplink information to the server apparatus, wherein the server apparatus is capable of understanding the past drop-in place information and the content information while associating the past drop-in place information and the content information with each other, the method comprising the steps of:
- detecting, as a detected parking spot, a point where the vehicle-mounted device has been powered off;
- deciding whether the detected parking spot is appropriate as a past drop-in place of the uplink information and deciding whether a duration for which the vehicle-mounted device has been powered off is more than a predetermined duration; and
- registering the detected parking spot as the past drop-in place of the uplink information if the detected parking spot is appropriate as the past drop-in place of the uplink information and the duration for which the vehicle-mounted device has been powered off is more than the predetermined duration.

* * * * *